(12) United States Patent
Kong (10) Patent No.: US 11,313,958 B2
(45) Date of Patent: Apr. 26, 2022

(54) DYNAMIC ECHO SIGNAL EMULATION FOR AUTOMOBILE RADAR SENSOR CONFIGURATIONS

(71) Applicant: Keysight Technologies, Inc., Santa Rosa, CA (US)

(72) Inventor: Hong-Wei Kong, Beijing (CN)

(73) Assignee: Keysight Technologies, Inc., Santa Rosa, CA (US)

( * ) Notice: Subject to any disclaimer, the term of this patent is extended or adjusted under 35 U.S.C. 154(b) by 255 days.

(21) Appl. No.: 16/552,112

(22) Filed: Aug. 27, 2019

(65) Prior Publication Data

US 2020/0319325 A1 Oct. 8, 2020

(30) Foreign Application Priority Data

Apr. 8, 2019 (CN) .......................... 201910276923.2

(51) Int. Cl.
*G01S 13/12* (2006.01)
*G01S 7/40* (2006.01)
*G01S 13/931* (2020.01)

(52) U.S. Cl.
CPC ............ *G01S 13/12* (2013.01); *G01S 7/4008* (2013.01); *G01S 7/4021* (2013.01); *G01S 7/4052* (2013.01); *G01S 13/931* (2013.01)

(58) Field of Classification Search
CPC ........ G01S 13/12; G01S 13/87; G01S 13/931; G01S 7/4008; G01S 7/4021; G01S 7/4052; G01S 7/406
See application file for complete search history.

(56) References Cited

U.S. PATENT DOCUMENTS

| 4,660,041 A * | 4/1987 | Maples ..................... G01S 7/40 342/170 |
| 5,886,663 A * | 3/1999 | Broxon, II ............ G01S 7/4052 342/165 |
| 2014/0269871 A1* | 9/2014 | Huynh ................... H04B 17/29 375/224 |
| 2017/0363719 A1* | 12/2017 | Ahmed ................. G01S 7/4052 |
| 2018/0106888 A1* | 4/2018 | Heu ...................... G01S 7/4008 |
| 2019/0126893 A1* | 5/2019 | Kim ........................ G01S 7/412 |
| 2019/0190624 A1* | 6/2019 | Kyosti ................. H04B 7/0413 |
| 2021/0116489 A1* | 4/2021 | Grieger .................. H04B 17/29 |

* cited by examiner

*Primary Examiner* — Timothy X Pham

(57) ABSTRACT

A system for testing automobile radar sensor configurations includes multiple probe arrays, multiple enclosures, a channel emulator and a test controller. The enclosures each enclose one of the probe arrays together with a corresponding different automobile radar sensor. Each probe array is configured to receive radar signals from the corresponding automobile radar sensor and emulate echo signals back to the corresponding automobile radar sensor. The channel emulator is configured to supply the echo signals to each of the probe arrays. The test controller includes a memory that stores instructions and a processor that executes the instructions. The test controller controls the channel emulator and is configured to perform performance testing on an automobile radar sensor configuration that includes the automobile radar sensors and an automobile driving controller that reacts to the echo signals received by each of the automobile radar sensors.

9 Claims, 7 Drawing Sheets

DYNAMIC ECHO SIGNAL EMULATION FOR AUTOMOBILE RADAR SENSOR CONFIGURATIONS

CROSS REFERENCE TO RELATED APPLICATIONS

The present application claims priority under 35 U.S.C. § 119(e) to Chinese Patent Application No. 201910276923.2, filed on Apr. 8, 2019. The entire disclosure of Chinese Patent Application No. 201910276923.2 is hereby specifically incorporated by reference in its entirety.

BACKGROUND

Millimeter waves result from oscillations at frequencies in the frequency spectrum between 30 gigahertz (GHz) and 300 gigahertz. Millimeter wave (mmWave) automotive radar is a key technology for existing advanced driver-assistance systems (ADAS) and for planned autonomous driving systems. For example, millimeter wave automotive radar is used in advanced driver-assistance systems to warn of forward collisions and backward collisions. Additionally, millimeter wave automotive radar may be used in planned autonomous driving systems to implement adaptive cruise control and autonomous parking, and ultimately for autonomous driving on streets and highways. Millimeter wave automotive radar has advantages over other sensor systems in that millimeter wave automotive radar can work under most types of weather and in light and darkness. Adaptation of millimeter wave automotive radar has lowered costs to the point that millimeter wave automotive radar can now be deployed in large volumes. Resultingly, millimeter wave automotive radars are now widely used for long range, middle range and short range environment sensing in advanced driver-assistance systems. Additionally, millimeter wave automotive radars are likely to be widely used in autonomous driving systems currently being developed.

Actual driving environments in which automotive radars may be deployed can vary greatly and many such driving environments may be complex. For example, actual driving environments may contain numerous objects, and some objects encountered in actual driving environments have complicated reflection and diffraction characteristics that affect echo signals. The immediate consequences of incorrectly sensing and/or interpreting echo signals may be that false warnings or improper reactions are triggered or warnings or reactions that should be triggered are not, which in turn can lead to accidents.

Figure 1:
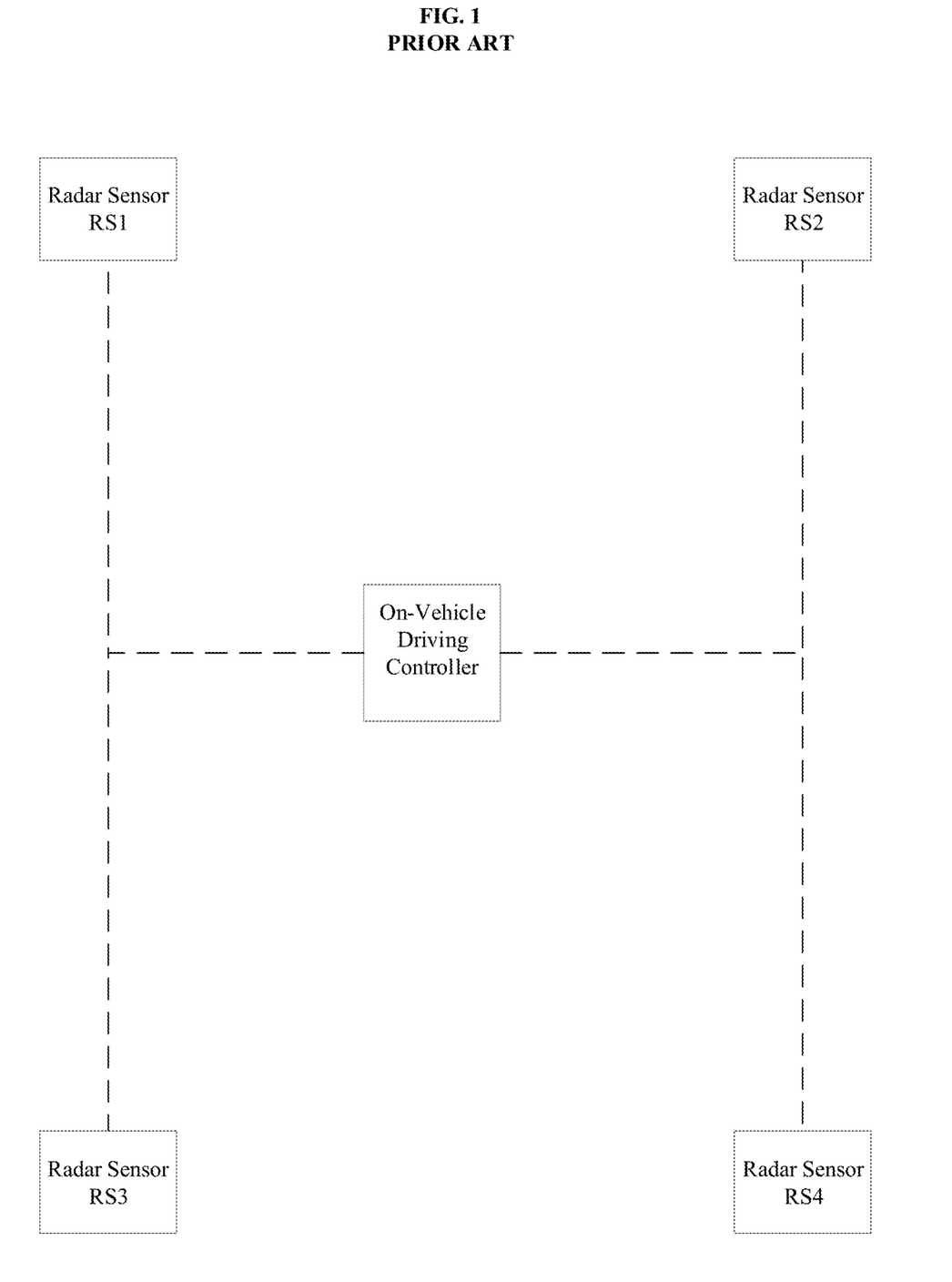
FIG. 1 illustrates a known configuration for radar sensors in a vehicle.

FIG. 1 illustrates a known configuration for automotive radars in a vehicle. In FIG. 1, four radar sensors emit radar signals, receive echo signals and provide the received echo signals to an on-vehicle driving controller. The four radar sensors include a first radar sensor RS1, a second radar sensor RS2, a third radar sensor RS3 and a fourth radar sensor RS4 and are arranged near the four corners of a vehicle. Each of the four radar sensors may have a transmit antenna array and a receive antenna array. In a vehicle, the on-vehicle driving controller interprets the received echo signals and autonomously controls the vehicle or supports control of the vehicle in response to the interpretation of the received echo signals, such as by autonomously braking, accelerating and/or turning, or by restricting braking, acceleration and/or turning.

In recent years, companies testing autonomous vehicles in actual driving environments have reported a series of accidents, showing the importance of thorough testing for automotive radar and the on-vehicle driving controllers. Automotive radars can be tested in different driving scenarios to avoid accidents of the types suffered by companies in testing already. A testing environment for automotive radars may include a scenario emulator which emulates echo signals from multiple targets (multi-target echo signals) to the different radar sensors on a vehicle under the different driving scenarios. The different radar sensors are tested using the emulated echo signals. However, use of scenario emulators so far has imposed challenges in designing test solutions. For example, to emulate the different scenarios, software capable of emulating the echo signals from multiple targets is required. Additionally, the hardware setup must be capable of replaying the echo signals. Considering that the echo signals need to be dynamically emulated from domains including a power domain, a time domain, a doppler frequency domain and a spatial domain for each radar sensor, it is difficult to design a testing environment with required flexibility and scalability. Additionally, data from multiple radar sensors is fused to aid the environment sensing and the scenario emulator thus needs to emulate the echo signals for the multiple radar sensors simultaneously and synchronously.

One solution is a millimeter wave automotive radar over the air (OTA) test solution with one anechoic chamber equipped with a single probe antenna. The probe antenna is connected to a radar target emulator which in turn is connected to the scenario emulator. This test solution is capable of emulating multiple targets in the same direction in all four domains (power, time, doppler frequency and spatial). However, this solution is typically used for a single radar sensor radio frequency (RF) and function test and can not emulate multiple targets with different signal directions. The capability of this solution for emulating highly dynamic scenarios is also limited due to the mechanical rotation speed of the single probe antenna.

Another solution is a millimeter wave automotive radar OTA test solution with one anechoic chamber equipped with a few probe antennas. The probe antennas are connected to a few radar target emulators which in turn are connected to the scenario emulator. The use of multiple probe antennas and multiple radar target emulators allows for emulation of multiple targets with different signal directions. The signal directions are decided by the position of each probe relative to the corresponding radar sensor. By mechanically changing the positions of the probe antennas or by electrically switching the signal among the probe antennas, the dynamic change of target echo signal direction can be emulated. Power, time and doppler frequency domain characteristics are emulated for each target using the radar target emulators. However, the capabilities of this solution in emulating the number of targets with different signal directions are directly related to the number of probe antennas used in the system, which does not scale very well. Additionally, mechanically moving the probe antennas to change signal direction dynamically limits the speed and the flexibility of the system due to the nature (e.g., complexity) of the mechanical systems. Switching of the probe antennas can help solve the speed limitation but the switching among a set of pre-located probe antennas also means that the dynamic scenarios which can be emulated are limited by, for example, the number of probe antennas and the probe antenna locations.

The two solutions described above do not adequately meet the requirements for highly dynamic scenarios. For example, for either solution an anechoic chamber that includes a vehicle is relatively large and expensive. Additionally, the testing environment of the two solutions lacks capability to emulate many targets with different echo signal directions that dynamically change. Moreover, emulated signals for multiple targets need to be generated for each radar sensor, and the testing environments of the two solutions do not provide properly for synchronization of the radar sensors and calibration to compensate for differences between locations of the radar sensors on the vehicle. Moreover, scalability of the number of targets in different signal directions is challenging, and multiple probe antennas may be required to emulate echoes for the same target in the latter solution.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

In view of the foregoing, the present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

Figure 2:
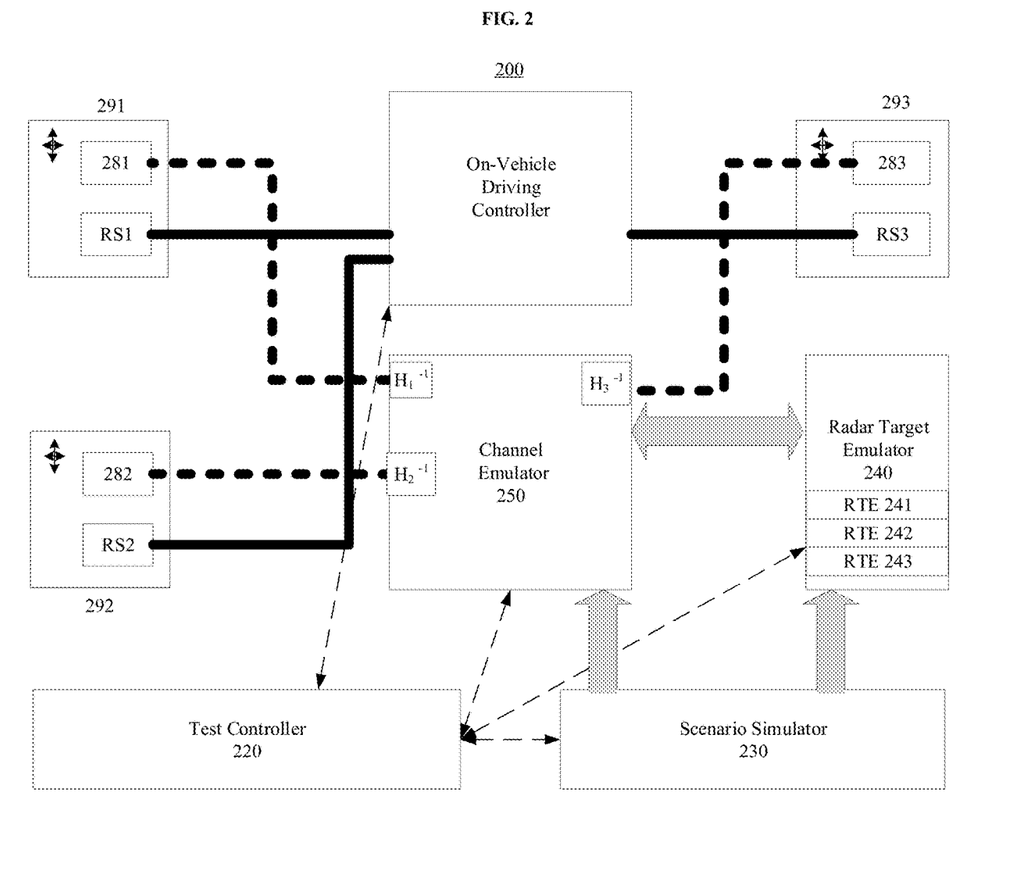
FIG. 2 is a simplified block diagram showing a test system for dynamic echo signal emulation for automobile radar sensor configurations, according to a representative embodiment.

FIG. 2 is a simplified block diagram showing a test system for dynamic echo signal emulation for automobile radar sensor configurations, according to a representative embodiment.

The test system 200 in FIG. 2 includes a test controller 220, a scenario simulator 230, a radar target emulator 240, a channel emulator 250, a first enclosure 291, a second enclosure 292, a third enclosure 293, a first probe array 281 in the first enclosure 291, a second probe array 282 in the second enclosure 292, and a third probe array 283 in the third enclosure 293.

The first enclosure 291 also includes a first radar sensor RS1. The second enclosure 292 also includes a second radar sensor RS2. The third enclosure 293 also includes a third radar sensor RS3. Each of the first radar sensor RS1, the second radar sensor RS2 and the third radar sensor RS3 may include a transmit antenna array and a receive antenna array. An automobile radar sensor configuration that includes the first radar sensor RS1, the second radar sensor RS2 and the third radar sensor RS3 also includes the on-vehicle driving controller shown in FIG. 2. However, rather than requiring the entire vehicle to be placed on a testing ground or in a testing environment, the automobile radar sensor configuration in FIG. 2 instead can be tested in isolation on a testing ground or in a testing environment using the test system 200 in FIG. 2. Additionally, while three enclosures with three probe arrays and three radar sensors are shown, an automobile radar sensor configuration may have four or more radar sensors so a test system 200 such as that shown in FIG. 2 may include four or more corresponding enclosures, probe arrays and radar sensors. For example, an automobile radar sensor configuration may have four radar sensors, six radar sensors, eight radar sensors or another number of multiple radar sensors, all coordinated and/or controlled by the on-vehicle driving controller. Each of the first probe array 281, the second probe array 282 and the third probe array 283 is connected to the channel emulator 250 and then to the radar target emulator 240 to form a setup to generate multi-target echo signals for the corresponding radar sensors.

Processing results from each of the first radar sensor RS1, the second radar sensor RS2 and the third radar sensor RS3 are provided to or generated by the on-vehicle driving controller insofar as each radar sensor is connected to the on-vehicle driving controller. The automobile radar sensor configuration subject to testing in FIG. 2 provides for emulation of the setup in an actual vehicle. The on-vehicle driving controller fuses the radar sensor data and perceives the overall surrounding environment based on the radar sensors.

As described above, each of the first enclosure 291, the second enclosure 292 and the third enclosure 293 is a shield box. Each enclosure may include one or more radio frequency (RF) ports connected to the probe array provided in each enclosure. The probe arrays are coupling probes inside the enclosures. Each enclosure may also include fixtures to hold the radar sensor and the corresponding probe array. Each enclosure may also include one or more interfaces to connect the radar sensor with the on-vehicle driving controller to process data out of the enclosure.

The test controller 220 and other test controllers described herein may include a memory that stores instructions and a processor that executes the instructions to perform some or all aspects of methods described herein. The test controller 220 controls tests of the automobile radar sensor configuration. For example, the test controller 220 coordinates actions taken by the scenario simulator 230, the radar target emulator 240 and the channel emulator 250 to implement tests of the automobile radar sensor configuration. The test controller 220 also receives notification of emission of each emulated echo signal from the radar target emulator 240 or the channel emulator 250, as well as data of reactions to the echoes from the on-vehicle driving controller.

Additionally, the test controller 220 performs performance testing on the automobile radar sensor configuration that includes the different radar sensors and the on-vehicle driving controller. The on-vehicle driving controller reacts to emulated echoes received by each radar sensor from the corresponding probe antennas in the first enclosure 291, the second enclosure 292 and the third enclosure 293. The data received by the test controller 220 from the on-vehicle drawing controller indicates a reaction to each emulated echo signal from the on-vehicle driving controller. The test controller 220 may analyze the data from the on-vehicle driving controller for characteristics of the reactions by the on-vehicle driving controller. The performance testing may test whether the on-vehicle driving controller reacts properly to the emulated echo signals.

As described herein, the test controller 220 may include hardware and/or software control interfaces to the other elements of the test system 200, so as to control and coordinate the other elements of the test system 200 to perform the testing. The test controller 220 may also receive the feedback information from the on-vehicle driving controller. The feedback can include, but is not limited to, radar sensor fusion results about the surrounding environment, the vehicle drive control information to update vehicle location in the drive test scenario, the vehicle state information, and more. Based on the feedback information, the test controller 220 may use, for example, the radar sensor fusion results to compare with the drive test scenario to provide evaluation results on the performance of the radar sensor fusion algorithms under the given drive test scenarios. Based on the feedback information, the test controller 220 may also use, for example, the location update information to update the location of the vehicle in the drive test scenario and then generate and send the updated radar echoes and multi-target reflection information to the channel emulator 250 and the radar target emulator 240 to play out, as this will form a closed loop test setup. Based on the feedback information, the test controller 220 may also use, for example, the drive control information, the vehicle location in the drive test scenario, and the configured drive test scenario to evaluate the probability of failure of the vehicle drive control algorithms under the configured drive test scenario.

The scenario simulator 230 and other scenario simulators described herein may include a memory that stores instructions and a processor that executes the instructions to perform some or all aspects of methods described herein. The scenario simulator 230 provides radar target parameters to the radar target emulator 240 and channel emulator parameters to the channel emulator 250 for each of multiple different driving scenarios. The scenario simulator 230 may store data sets for dozens, hundreds or even thousands of different driving scenarios. For example, different driving scenarios may involve driving through a crowded urban area or an open highway, and different scenarios may involve the same drives (e.g., locations and routes) at different times of the day and in different weather conditions. The stored data sets of the scenario simulator 230 for the different driving scenarios may be based on readings obtained in actual test drives by automobiles in the driving scenarios, where the actual test drives are closely recorded and monitored to determine what reactions by the on-vehicle driving controller would be proper at different times.

The scenario simulator 230 is used to configure drive test scenarios to test the radar sensors and the on-vehicle driving controller in the automobile radar sensor configuration. After the configuration, the scenario simulator 230 may be the source of the simulated echoes that simulate the multi-target reflections for each radar sensor under the drive test scenarios. As described herein, the scenario simulator 230 may also load the antenna element complex antenna pattern for the radar sensors while simulating the multi-target echoes to include the impact of the radar sensor antennas during the multi-target echo simulations. The simulated radar echoes and the multi-target reflection information may then be sent to the channel emulator 250 and also the radar target emulator 240 for playing out to generate the emulated multi-target echoes. A coupling matrix for each of a transmit antenna array and a receive antenna array of each automobile radar sensor may be measured as a complex antennal element pattern of the automobile radar sensors. The measured complex antenna element pattern of the radar sensors is loaded into the channel emulator 250 to include the impact of the antennas on each radar sensor in the multi-target reflection channel emulation. A subset of probe antenna elements may be selected for each of the probe arrays based on measurements of the transmit coupling matrix and receive antenna coupling matrix for the corresponding automobile radar sensor. The subset of probe antenna arrays may be varied for different automobile radar sensor configurations for different automobiles.

The radar target emulator 240 and other radar target emulators described herein are instruments that may include a memory that stores instructions and a processor that executes the instructions to perform some or all aspects of methods described herein. The radar target emulator 240 provides radar target emulations 241, 242 and 243 to the channel emulator 250 for each of multiple driving scenarios. The radar target emulations 241, 242 and 243 are representative of multiple radar target emulations for different scenarios provided by the scenario simulator 230. The radar target emulations 241, 242 and 243 represent echo characteristics of objects encountered in each of the different scenarios as radar signals from the radar sensors in an automobile radar sensor configuration reflect off of the objects back to the radar sensors. Moreover, the radar target emulator 240 may receive, generate, send and/or store data sets for any scenario provided by the scenario simulator 230. The radar target emulations 241, 242 and 243 may be based on actual test drives performed by a test vehicle, so that simulated drive test scenarios reflect echoes captured in actual test drives.

As described herein, the radar target emulator 240 and other radar target emulators may receive transmitted signals from the different transmitters and Tx arrays of the radar sensors and then generate the corresponding echoes for each of the radar sensors. However, as also described herein, the corresponding echoes may also be generated in advance, and timed based on an understanding of the periodicity of the radar signals so that a set of echoes are arranged in advance of notification of transmission of the periodic radar signals for each drive scenario.

The number of the radar target emulations 241, 242 and 243 included in and provided by the radar target emulator 240 is not limited to three and may be the same number as the number of radar sensors in the automobile radar sensor configuration. In an embodiment, the number of radar target emulations provided by the radar target emulator 240 is a one-to-one ratio with the number of radar sensors in the automobile radar sensor configuration being tested. In other embodiments, more or less radar target emulations may be provided than there are radar sensors in the automobile radar sensor configurations. The radar target emulator 240 may also receive radar target parameters from the scenario simulator 230 and provide the radar target signals to the channel emulator 250 based on the received radar target parameters. The channel emulator 250 uses the radar target signals as inputs to generate the echo signals (echoes) emulated by the probe arrays. The radar target emulator 240 varies the radar target signals based on the different driving scenarios provided by the scenario simulator 230.

Each of the first probe array 281, the second probe array 282 and the third probe array 283 is configured to receive radar signals from the corresponding automobile radar sensor and emulate echo signals back to the corresponding automobile radar sensor. Each of the first probe array 281, the second probe array 282 and the third probe array 283 may include an array of individual antenna elements arranged, for example, in a 16-by-16 matrix. Each individual antenna element in an array may be individually controllable, such as to connect to one of the RF connectors of the instruments such as the channel emulator 250 and/or the radar target emulator 240. Additionally, energy signatures of signals emitted from each individual antenna element may be designed to be different from one another. For example, different signals emitted from different individual antenna elements in a probe array may have different polarizations. Individual antenna elements in a probe array also may be specifically controlled to connect to RF connectors of the instruments such as the channel emulator 250 and/or the radar target emulator 240 to match signatures of the corresponding radar sensors in the enclosures. By choosing a subset of the probe antenna elements with a number equal to the number of antennas of the Tx array of the radar sensor or the number of antennas of the Rx array of the radar sensor, a coupling radiation channel matrix $H_n$ between the probe array and the corresponding radar sensor Tx array or Rx array is formed, to couple transmissions from the radar sensor transmissions signal out of the enclosures to the channel emulator 250 and to couple output of the channel emulator 250 into the enclosures and back to the corresponding radar sensor.

The probe antenna array subsets which result in the best conditioned coupling matrixes for the radar sensor Tx array and the radar sensor Rx array may be chosen respectively for a dynamic echo emulation test. The dynamic echo emulation test may start by choosing probe antenna array elements and connecting the chosen probe antenna array elements to the RF connectors of the instrument (e.g., the channel emulator 250) respectively. An example probe antenna array which can ensure a well conditioned coupling matrix for the radar sensor Tx array and the radar sensor Rx array is an 8×8 array with element spacing at 5 wavelengths or higher relative to the carrier frequency used by the 8×8 array. The adjacent elements in this example probe antenna array may have cross polarization, and the distance from the probe antenna array may be 5 centimeters to 10 centimeters from the radar sensor within an enclosure.

The first enclosure 291, the second enclosure 292 and the third enclosure 293 may each be an anechoic chamber. The sizes of the first enclosure 291, the second enclosure 292 and the third enclosure 293 may be relatively small in that each does not need to fit a vehicle, and instead may be small enough to fit a radar sensor from an automobile radar sensor configuration and a corresponding probe array from the test system 200. The enclosures are each a shield box, and may include radio frequency (RF) ports, fixtures to hold the radar sensor and the corresponding probe array, and at least one interface. The RF port is connected to the probe array inside the enclosure. The fixtures hold the radar sensor and the probe array. An interface connects the radar sensor to provide processed data out of the enclosure to the on-vehicle driving controller. The fixtures can be adjusted to change the positions of the coupling probe antenna array and the radar sensor.

The probe array and the radar sensor in each enclosure may couple via near field coupling. The coupling matrix may be measured as part of the testing before the drive test simulations are executed. The coupling matrixes may include a radar sensor transmit (Tx) coupling matrix and a radar sensor receive (Rx) coupling matrix. The measurement is controlled by the test controller 220. For the radar sensor transmit coupling matrix, the channel emulator 250 is used to capture and measure the transmitted signals from a radar sensor. For the receive coupling matrix measurement, an analog-to-digital converter on a radar sensor may be used to capture raw data, convert the raw data to digital, and the converted data can be analyzed to measure the receive coupling matrix. The coupling matrix is then used by the channel emulator 250 to emulate the channel parameters and radar target parameters provided for transmission by each probe antenna.

The channel emulator 250 and other channel emulators described herein are instruments and may include a memory that stores instructions and a processor that executes the instructions to perform some or all aspects of methods described herein. The channel emulator 250 applies channel effects to the radar target signals based on the channel emulator parameters. The channel emulator 250 also provides radar target signals with the channel effects applied to the probe arrays as echo signals that emulate echoes to the radar signals from the radar sensors. The channel emulator 250 and/or the radar target emulator 240 may notify the test controller 220 of each echo signal insofar as the performance testing by the test controller 220 may be based on the reaction to each echo signal. The channel emulator 250 receives channel emulator parameters from the scenario simulator 230 and radar target signals from the radar target emulator 240. The channel emulator 250 is loaded with radar sensor transmit antenna complex patterns and radar sensor receive antenna complex patterns for each of the radar sensors. The channel emulator 250 applies an inversion of a radiation channel matrix for each of the radar sensors based on the radar sensor transmit antenna complex patterns and radar sensor receive antenna complex patterns for each of the radar sensors. The channel emulator 250 provides inversion matrices to the first probe array 281, the second probe array 282 and the third probe array 283. For example, the channel emulator 250 may measure a transmit coupling matrix for each of the first radar sensor RS1, the second radar sensor RS2 and the third radar sensor RS3 by capturing radar signals emitted by each of the first radar sensor RS1, the second radar sensor RS2 and the third radar sensor RS3 automobile radar sensors. Signals of a receive coupling matrix for each of the first radar sensor RS1, the second radar sensor RS2 and the third radar sensor RS3 may be captured directly from the first radar sensor RS1, the second radar sensor RS2 and the third radar sensor RS3, converted from analog to digital by an analog-to-digital converter on each of the first radar sensor RS1, the second radar sensor RS2 and the third radar sensor RS3 and measured as digital representations of the signals of the receive coupling matrix for each of the first radar sensor RS1, the second radar sensor RS2 and the third radar sensor RS3. The inversion matrices provided by or otherwise applied by the channel emulator 250 may be based on the measurements of the transmit coupling matrix and the receive coupling matrix for each of the first radar sensor RS1, the second radar sensor RS2 and the third radar sensor RS3. The channel emulator 250 receives radar target signals from the radar target emulator 240. The channel emulator 250 varies the echo signals based on the driving scenarios provided by the scenario simulator 230.

The test system 200 can be used in a variety of ways other than testing reactions by the on-vehicle driving controller. For example, a simplified setup of the test system 200 can be used to test each automobile radar sensor individually. In this example, each automobile radar sensor is subject to multiple different emulated drive scenarios. The measurements may be used to build a radar sensor model specific to each automobile radar sensor.

In another example, the test system 200 can be used to optimize locations and configurations of the automobile radar sensors on a vehicle. For example, multiple different configurations can each be subject to the same emulated drive scenarios to identify which result in the best signal readings and reactions by the on-vehicle driving controller. Configurations can be varied by changing the number of automobile radar sensors, and locations of automobile radar sensors and/or orientations of automobile radar sensors. Locations of the automobile radar sensors in the test system 200 (i.e., within each enclosure) may be varied by changing characteristics that affect emulation, such as by adjusting signal strength and/or relative positions of the automobile radar sensor and the corresponding probe array within an enclosure.

Figure 3:
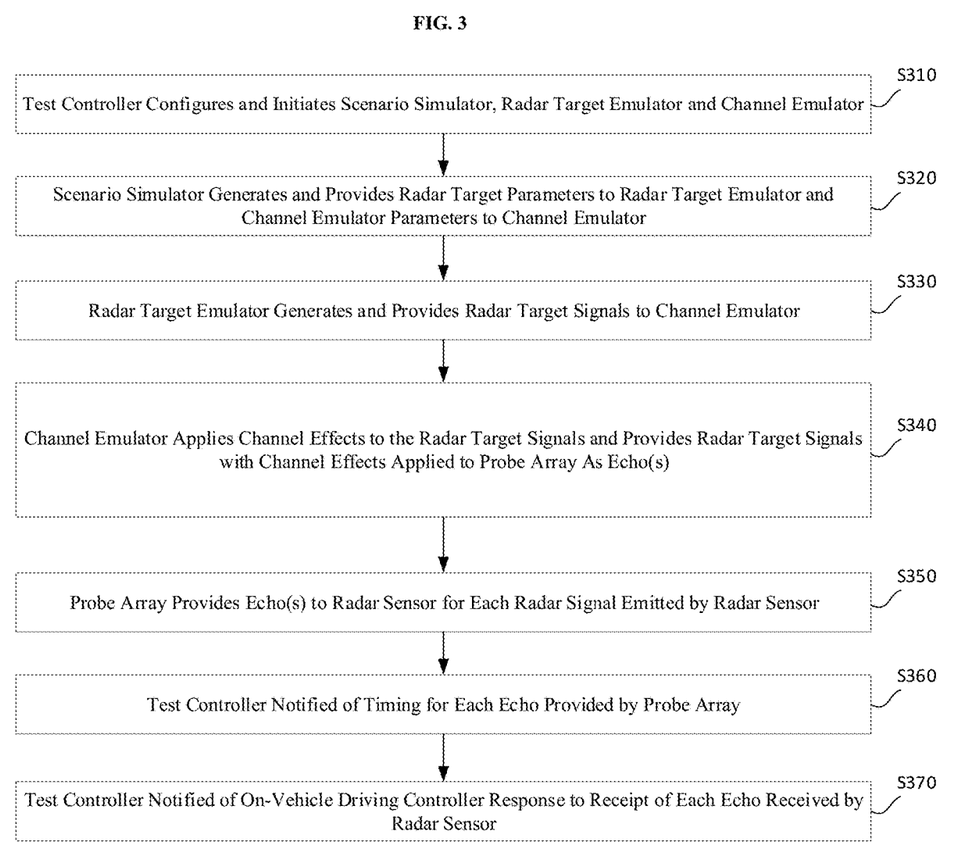
FIG. 3 illustrates a flow diagram for testing using dynamic echo signal emulation for automobile radar sensor configurations, in accordance with a representative embodiment.

FIG. 3 illustrates a flow diagram for testing using dynamic echo signal emulation for automobile radar sensor configurations, in accordance with a representative embodiment.

In the method of FIG. 3, the method begins at S310 with the test controller configuring and/or initiating a scenario simulator, a radar target emulator, and a channel emulator. The scenario simulator, the radar target emulator and the channel emulator in FIG. 3 may be three separate devices or systems as in FIG. 2. Alternatively, the radar target emulator and the channel emulator in FIG. 3 may be a single device or system that implements functionality of a radar target emulator and a channel emulator as described otherwise separately for embodiments herein. The configuration at S310 may involve providing instructions such as a set of driving scenarios to be implemented by the scenario simulator. The initiation may involve providing instructions to turn on, activate, or otherwise initiate the scenario simulator, the radar target emulator and the channel emulator.

At S320, the scenario simulator generates and provides radar target parameters to the radar target emulator and channel emulator parameters to the channel emulator. The scenario simulator may store details of numerous different driving scenarios. The details reflect characteristics of echoes received by radar sensors in test drives which serve as the basis of the different driving scenarios. Therefore, the details reflect the different echoes received by different radar sensors for each scenario. The radar target parameters and the channel emulator parameters are provided so as to emulate the echoes received by the radar sensors in the test drives which serve as the basis for the simulated drive test scenarios. In an embodiment, the scenario simulator may newly generate radar target parameters or channel emulator parameters, such as when a lapse exists in a scenario that otherwise includes a complete set of radar target parameters and channel emulator parameters. The scenario simulator may otherwise generate the radar target parameters and the channel emulator parameters by retrieving stored sets of radar target parameters and channel emulator parameters based on each driving scenario of a set provided from the scenario simulator at S310.

At S330, the radar target emulator generates and provides radar target signals to the channel emulator. The radar target signals are used by the channel emulator as inputs to provide echo signals (echoes) responsive to radar signals from the radar sensor. The generation of radar target signals is based on the radar target parameters received from the scenario simulator at S320. The radar target parameters and radar target signals vary for each driving scenario and may consist of details of echoes from one or more objects encountered by radar sensors in actual driving tests that result in the driving scenarios. The radar target signals may be isolatable to individual objects or may be composite signal patterns that reflect multiple or even all objects contributing to an echo received by a radar sensor in an actual driving test.

Although not shown in FIG. 3, the radar target signals may be provided at S330 based upon receipt of notification of receipt of radar signals from the radar sensors in the automobile radar sensor configuration. For example, radar target signals may be provided one at a time to the channel emulator based on receipt of each radar signal from the radar sensors. The radar target signals may be generated dynamically based on the received radar signal or may be predetermined in advance as a set so that the set of echoes are known in advance and provided in a predetermined order at a timing that appears to react to emission of each radar signal from the radar sensors. The radar target emulator will be notified of receipt of the radar signal in at least the instance when the echoes are provided one by one but will typically be notified in any instance by receiving the radar signal via the probe array and the channel emulator. When the radar target emulator has the echoes in advance, it may address latency due to the digital radar target emulator emulating echoes over a very short distance in the test systems described herein. One way of providing the echoes in advance is to leverage the fact that the radar signals are periodical signals. A set of radar signals can be captured and analyzed in advance to identify the period and then the echoes can be provisioned at the radar target emulator in advance before the specific radar signals are received.

At S340, the channel emulator applies channel effects to the radar target signals and provides the radar target signals with the channel effects applied to probe arrays as echoes. Examples of channel effects include the radar sensor antenna pattern emulation, the angle of departure, angle of arrival emulation, background interference and clatter emulation, the inversion of the coupling matrix etc. The channel emulator may have function blocks for applying the inversion matrixes, where the inversion matrix corresponds to each of the coupling radiation channel matrix $H_n$. As noted previously, the radar target emulator functionality and the channel emulator functionality can be implemented in one instrument or two different instruments, and the functional partition between the radar target emulator and the channel emulator may be flexible such that aspects can be varied for different scenarios.

The channel effects used to provision the probe arrays at S340 can be obtained based on testing of the radar sensors for characteristics prior to the testing described herein. For example, to incorporate impact of the antennas in each radar sensor in the channel emulation, the antenna element complex antenna pattern may be loaded into the channel emulator and emulated by the channel emulator when emulating the multi-target echo signals. If the multi-target echo signals have already incorporated the impact of the antennas in the radar sensors, then the multi-target echo signals may be directly emulated with the channel emulator without having to load the radar sensor antenna element pattern again. The complex antenna pattern of the radar sensors can be pre-measured in over the air (OTA) testing such as in a compact antenna test range (CATR) chamber, a far-field chamber or a mid-field OTA chamber.

Receivers on the radar sensors are capable of measuring the received signal strength for each receive element and also the relative phase between the different receive channels. Each radar sensor can report the measurement results either by responding to a measurement command through the interfaces described herein, or by saving the measurement results into data files. Transmitters on each radar sensor can be set to a test mode such that each individual transmitter antenna pattern from the Tx arrays can be measured.

At S350, the probe arrays provide the echoes to the radar sensors for each radar signal emitted by the radar sensors. The echoes are responsive to the radar signals. That is, the radar target signals with the channel effects are now passed to the probe array as the echo(s) to the radar sensor. In an embodiment, the timing of the radar signals may be established prior to the process in FIG. 3, and the echoes may be provided on a predetermined basis at set intervals based on establishing the timing of the radar signals. In other words, some aspects of dynamism may be removed in the process of FIG. 3 by establishing beforehand echoes to be provided for a period of time rather than one echo at a time, so that the echoes from the probe array provided at S350 may be automatically timed beforehand based on establishing the periodicity of the radar signals. Alternatively, echoes may be generated and played one at a time based on receipt of each radar signal emitted by the radar sensors.

At S360, the test controller is notified of the timing for each echo provided by a probe array. The test controller also receives a notification of reactions from the on-vehicle driving controller responsive to each echo signal received by the radar sensors in the automobile radar sensor configuration being tested. The timing for each echo is used to coordinate information received from the on-vehicle driving controller, so that reactions by the on-vehicle driving controller can be synchronized with echoes in the analysis performed in the testing. Similar to the drive test scenario described immediately above, timing of the radar sensor periodicity may be established beforehand, so correlation between echoes and reactions by the on-vehicle driving controller may be partly established by the test controller beforehand. In other words, the test controller may be provided with a predetermined set of echo identifications and expected reactions, and then simply analyze the reactions at predetermined timings. The predetermined timings may be known before the testing begins, based on identification of the periodicity of the radar sensors before the testing begins.

At S370, the test controller is notified of the on-vehicle driving controller response to receipt of each echo received by a radar sensor. The on-vehicle driving controller response may be a subject or even the primary subject of the testing of the radar sensor configuration for a vehicle, so that how the on-vehicle driving controller responds to echoes received by each radar sensor may be systematically analyzed to identify faults that may lead to accidents.

Figure 4:
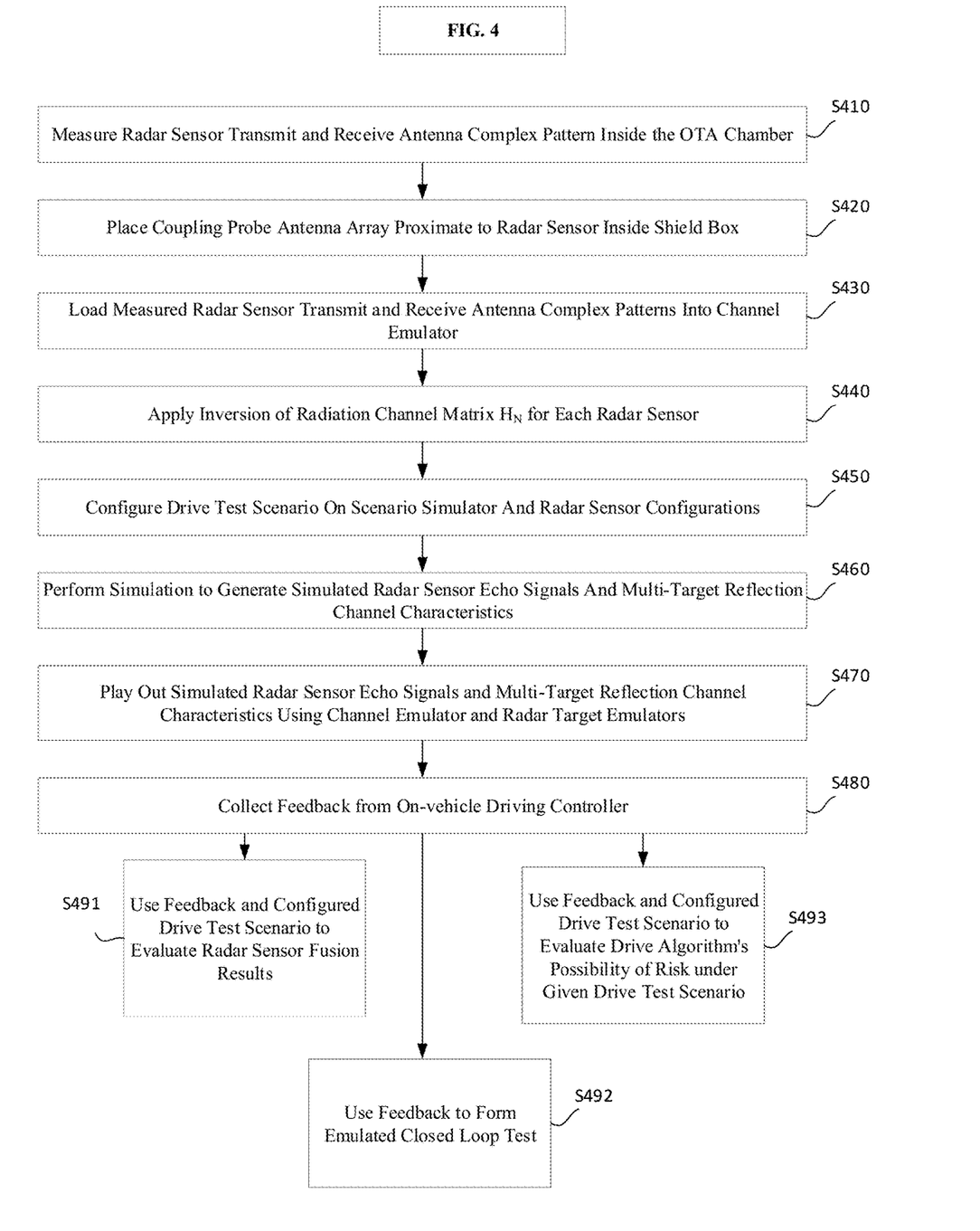
FIG. 4 illustrates another flow diagram for testing using dynamic echo signal emulation for automobile radar sensor configurations, in accordance with a representative embodiment.

FIG. 4 illustrates another flow diagram for testing using dynamic echo signal emulation for automobile radar sensor configurations, in accordance with a representative embodiment.

In the method of FIG. 4, the method starts at S410 by measuring the radar sensor transmit and receive antenna complex pattern(s) inside an over-the-air chamber. The measurements may be performed inside an anechoic chamber, and examples of anechoic chambers may include the enclosures described herein, though measurements of the radar sensor transmit and receive antenna complex pattern(s) may also be performed in another enclosure which shields signals from outside interference.

At S420, the coupling probe antenna array is placed proximate to a radar sensor inside a shield box. The shield box may be an enclosure as described herein. The coupling probe antenna array may be the probe array described elsewhere herein. And the placement at S420 may be repeated for each pair of coupling probe antenna arrays and radar sensors. A radar sensor configuration for a vehicle may include four or more radars and an on-vehicle driving controller. In use, a vehicle may have the radars arranged around the periphery of the vehicle such as at four corners of the vehicle, and the radars provide functions for near-field, middle-field and far-field radar detections of nearby objects that may result in an accident.

At S430, the measured radar sensor transmit antenna complex pattern and receive antenna complex pattern are loaded into a channel emulator. That is, the method in FIG. 4 includes loading the channel emulator with radar sensor transmit antenna complex patterns and radar sensor receive antenna complex patterns for each of the radar sensors in the automobile radar sensor configuration being tested. The radar sensor transmit antenna complex pattern and receive antenna complex pattern are used by the channel emulator as a basis for the channel parameters provided to probe antennas when communicating with the radar sensors.

At S440, an inversion of the radiation channel matrix $H_n$ is applied by the channel emulator for each radar sensor, so that each probe array interacts properly with the corresponding radar sensor. The antenna arrays are in the reactive field of each radar sensor within the enclosures described herein, so that that coupling radiation matrix between the radar sensor and the corresponding coupling probe antenna array is stable and well-conditioned. Additionally, the inversion of the radiation channel matrix is applied to the radiation channel matrix $H_n$ to decouple the radiation channel and form a wireless cabling connection.

At S450, a drive test scenario is configured on the scenario simulator, and radar sensor configurations are configured on the radar target emulator.

At S460, a simulation is performed to generate the simulated radar sensor echo signals and reflection channel characteristics by the channel emulator.

At S470, the simulated radar sensor echo signals and reflection channel characteristics are played out using the channel emulator and the radar target emulator. That is, the simulated radar sensor echo signals and reflection channel characteristics are provided as signals to the individual probe arrays in the enclosures for transmission to the corresponding radar sensors in the enclosures.

At S480, feedback is collected from the on-vehicle driving controller. The feedback may be collected by a test controller as described herein. Feedback is based on the signals received by the radar sensors and provided to the on-vehicle driving controller for interpretation and reaction. For example, the signals may reflect an object in a road ahead, or a vehicle merging from the side, so that the on-vehicle driving controller is expected to properly interpret the signals from the radar sensors and react to any dangers reflected in the signals. The interpretations and/or reactions are provided to the test controller as the feedback at S480.

At S491, the feedback and configured drive test scenario are used to evaluate the radar sensor fusion results. In other words, the feedback and configured drive test scenario are used to evaluate performance of fusion of the radar sensors in a configuration, such as whether the radar sensors collectively are accurately detecting objects presented during driving scenarios.

At S492, the feedback is used to form an emulated closed loop test. That is, feedback information from the on-vehicle driving controller is used to update the channel emulator and the radar target emulator to form an emulated closed loop test. Additional testing can then be performed based on the updates to the channel emulator and the radar target emulator.

At S493, the feedback and configured drive test scenario are used to evaluate a drive algorithm's possibility of risk under a given drive test scenario. That is, a fusion algorithm for each radar sensor may be evaluated based on the feedback from the on-vehicle driving controller and the configured drive test scenario. Alternatively, performance of an autonomous driving algorithm can be evaluated based on the feedback from the on-vehicle driving controller and the configured drive test scenario.

The functions at S491, S492 and S493 are examples of uses of the test system(s) described herein. Feedback can be used to evaluate radar sensor performance, to improve testing, and to evaluate the on-vehicle driving controller performance. These are only examples of end uses of the test system(s) described herein, but the ultimate benefit may be better performance in avoiding accidents and reducing death and injury that result from such accidents.

Figure 5:
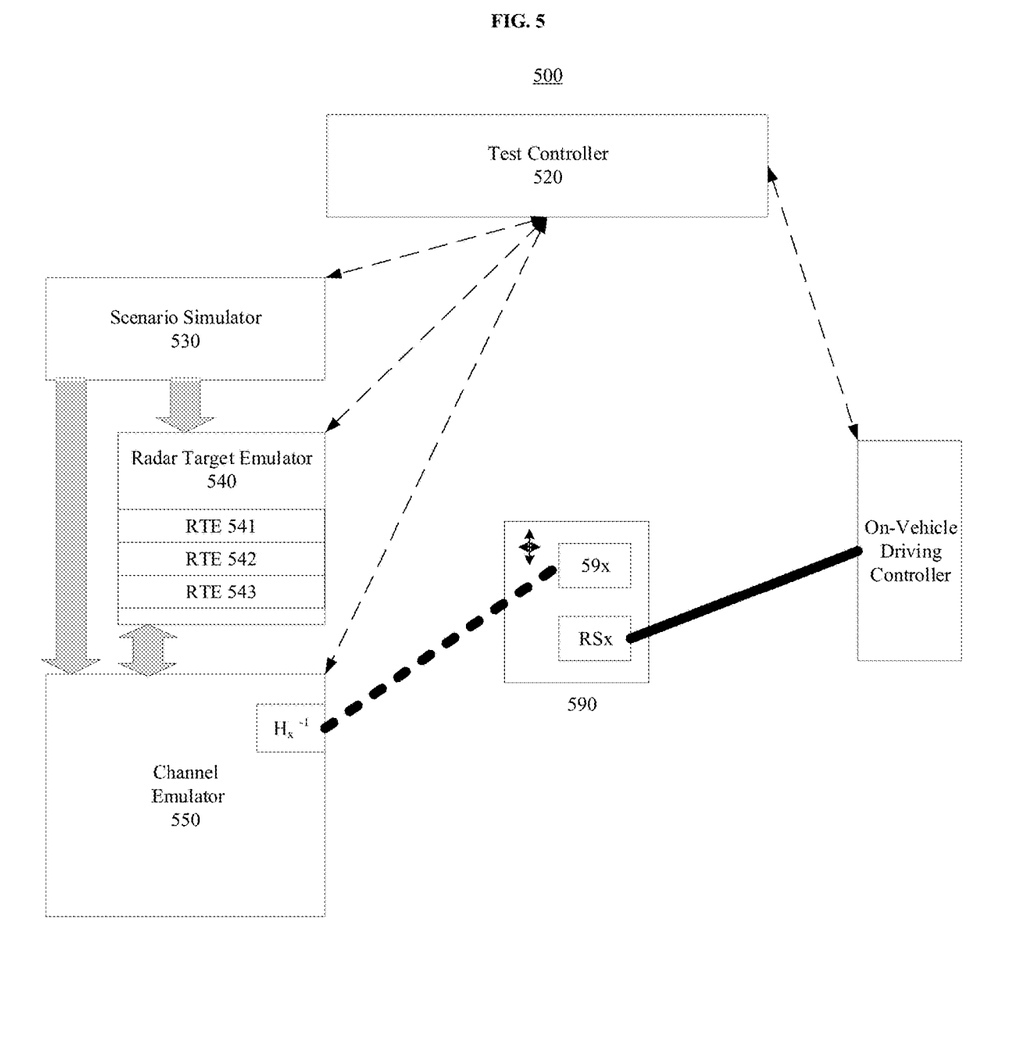
FIG. 5 is a simplified block diagram showing a logical arrangement of a test system for dynamic echo signal emulation for automobile radar sensor configurations, according to a representative embodiment.

FIG. 5 is a simplified block diagram showing a logical arrangement of a test system for dynamic echo signal emulation for automobile radar sensor configurations, according to a representative embodiment.

The test system 500 in FIG. 5 includes a test controller 520, a scenario simulator 530, a radar target emulator 540, a channel emulator 550, an enclosure 590 and a probe array 59x in the enclosure 590. The enclosure 590 and the probe array 59x are representative of multiple such enclosure and probe arrays but are shown in isolation for clarity in the embodiment of FIG. 5.

A radar sensor RSx is also provided in the enclosure 590 with the probe array 59x, and the configuration for vehicle radars that includes the radar sensor RSx also includes an on-vehicle driving controller. The configuration for vehicle radars that includes the radar sensor RSx and the on-vehicle driving controller is tested by the test system 500 in FIG. 5. The number of radar sensors RSx in the configuration for vehicle radars and the number of probe arrays 59x in the test system 500 may be more than three. For example, the number of radar sensors RSx and probe arrays 59x may be four or more. However, the radar sensors RSx and the enclosures such as the enclosure 590 do not have to be arranged in the same physical configuration as in a vehicle. Rather, the enclosures such as the enclosure 590 can be arranged close together, stacked on top of one another, adjacent to one another, and in other arrangements since the testing of the radar sensors RSx in the enclosures does not necessarily reflect physical proximity of the radar sensors RSx to one another.

The radar target emulator 540 includes radar target emulations 541, 542, 543 as representative examples of radar target emulations that can be provided to probe arrays such as probe array 59x in order to provide echoes responsive to radar signals from the radar sensors that include the radar sensor RSx. The channel emulator 550 implements functionalities to emulate channels for the echoes provided from the probe array 59x to the radar sensor RSx. An inversion matrix is one function implemented inside the channel emulator 550.

In the embodiment of FIG. 5, the scenario simulator 530 configures the channel emulator 550 and the radar target emulator 540. The radar target emulator 540 provides radar target emulations to the channel emulator 550, which provides echoes to the probe array 59x based on the radar target emulations. The echoes are received by the radar sensors RSx and passed to the on-vehicle driving controller. The on-vehicle driving controller executes instructions to react to the echoes so as to reduce or eliminate accident potentials. The test controller 520 receives signals indicating the reactions by the on-vehicle driving controller, and the testing may include analysis of whether the on-vehicle driving controller is reacting properly to dangers encountered in any particular scenario generated by the scenario simulator 530.

Within the enclosure 590, the interaction between the probe array 59x and the radar sensor RSx is based on pre-measurements of the transmit coupling matrix for the radar sensor RSx and of the receive coupling matrix for the radar sensor RSx. The channel emulator 550 measures the transmit coupling matrix for each radar sensor RSx being tested by capturing radar signals emitted by each of the radar sensors RSx. The receive coupling matrix is measured by first capturing signals of the receive coupling matrix for each radar sensor and then measuring digital representations of the signals of the receive coupling matrix for each radar sensors being tested. The measured radar sensor transmit antenna complex pattern and receive antenna complex pattern are loaded into the channel emulator 550, and the inversion of the radiation channel matrix $H_n$ is applied for each of the radar sensors. That is, the test system 500 in FIG. 5 is prepared for testing by loading the channel emulator 550 with radar sensor transmit antenna complex patterns and radar sensor receive antenna complex patterns for each of the radar sensors in the automobile radar sensor configuration being tested, so that once testing of the automobile radar sensor configuration begins the impact of the antenna complex patterns can be taken into consideration.

Figure 6:
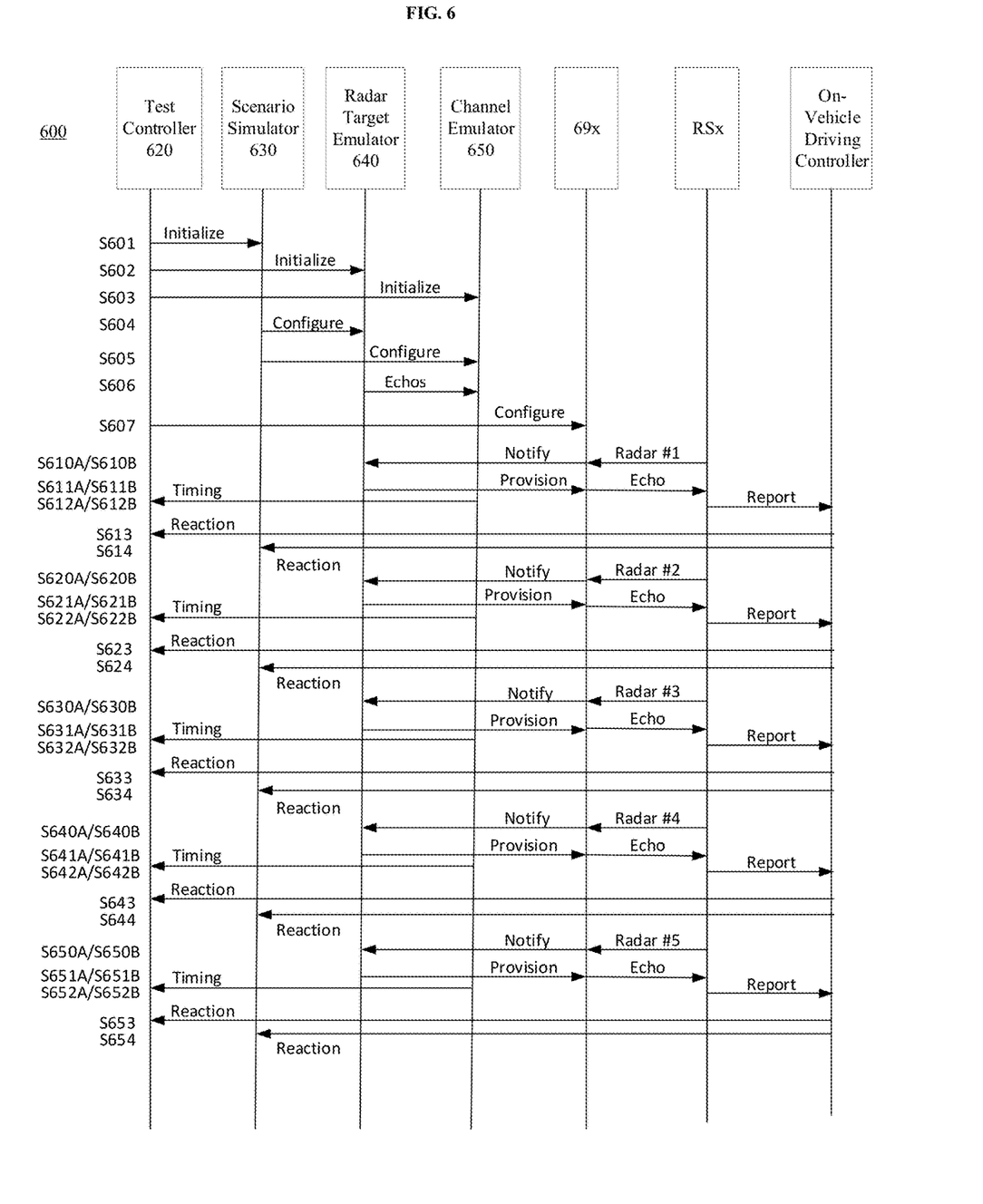
FIG. 6 illustrates a signal flow diagram for a test system for dynamic echo signal emulation for automobile radar sensor configurations, according to a representative embodiment.

FIG. 6 illustrates a signal flow diagram for a test system for dynamic echo signal emulation for automobile radar sensor configurations, according to a representative embodiment.

In the embodiment of FIG. 6, signals flow between a test controller 620, a scenario simulator 630, a radar target emulator 640, a channel emulator 650, at least one probe array 69x, at least one radar sensor RSx, and an on-vehicle driving controller. The test system 600 includes the test controller 620, the scenario simulator 630, the radar target emulator 640, the channel emulator 650, and the at least one probe array 69x. The system under test includes the at least one radar sensor RSx, and the on-vehicle driving controller.

At S601, the test controller 620 initializes the scenario simulator 630. At S602, the test controller 620 initializes the radar target emulator 640. At S603, the test controller 620 initializes the channel emulator 650. The test controller 620 may initializes the scenario simulator 630, the radar target emulator 640 and the channel emulator 650 by sending an initial instruction to turn on, and subsequent instructions to provision the scenario simulator 630, the radar target emulator 640 and the channel emulator 650 with any information provides by the test controller 620 for the testing.

At S604, the scenario simulator 630 configures the radar target emulator 640, such as by informing the radar target emulator 640 of one or more scenarios to be used in a testing sequence. The scenario simulator 630 may inform the radar target emulator 640 of the individual radar targets (e.g., the echo characteristics of individual radar targets) to be emulated, or of a composite radar target (e.g., a composite of echo characteristics) to be emulated. Alternatively, the radar target emulator 640 may receive an instruction and identify individual radar targets or a composite radar target based on the instruction. The configuration of the radar target emulator 640 results in individual configuration for each radar sensor RSx used in the testing.

At S605, the scenario simulator 630 configures the channel emulator 650. The configuration at S605 may be information such as timing of scenarios, identity of scenarios, characteristics that will vary during the scenarios, and other forms of information that the channel emulator 650 will use to emulate channels when provisioning the at least one probe array 69x with echoes to provide to corresponding radar sensors RSx.

At S606, the radar target emulator 640 provides echoes to the channel emulator 650. For example, the radar target emulator 640 may provide echoes to be used for a period of time during each scenario, such as 30 seconds or 5 minutes. The radar target emulator 640 may provide a different set of echoes for each probe array 69x and each corresponding radar sensor RSx.

At S607, the test controller 620 configures each of the probe arrays 69x. For example, the test controller 620 may turn each probe array 69x on at S607.

Next, a test begins and a series of radar emissions from the radar sensors RSx are detected and a series of echoes are provided to the radar sensors RSx responsive to each radar emission. As described below, each sequence of actions may be individually performed for each radar emission during a scenario or multiple scenarios. However, it will be understood that the five sets of actions from S610A to S654 are representative of what may be thousands of sets of actions for one or more scenarios being tested. The testing described herein may be performed one scenario at a time but may also involve switching between scenarios after each scenario is completed.

At S610A/S610B, a radar emission is received by each probe array 69x from the corresponding radar sensor RSx (S610A), and each probe array 69x individually notifies the radar target emulator 640 via the channel emulator 650 (S610B). At S611A, the radar target emulator 640 provisions each probe array 69x via the channel emulator 650, and at S611B each probe array 69x provides the echo signal to the corresponding radar sensor RSx. At S612A timing of the provisioning is reported by the channel emulator to the test controller 620, and at S612B each radar sensor RSx reports the received echo signal to the on-vehicle driving controller. At S613 the on-vehicle driving controller reports the reaction to the echo to the test controller 620. At S614 the on-vehicle driving controller reports the reaction to the echo to the scenario simulator 630.

At S620A/S620B, a radar emission is received by each probe array 69x from the corresponding radar sensor RSx (S620A), and each probe array 69x individually notifies the radar target emulator 640 via the channel emulator 650 (S620B). At S621A, the radar target emulator 640 provisions each probe array 69x via the channel emulator 650, and at S621B each probe array 69x provides the echo signal to the corresponding radar sensor RSx. At S622A timing of the provisioning is reported by the channel emulator to the test controller 620, and at S622B each radar sensor RSx reports the received echo signal to the on-vehicle driving controller. At S623 the on-vehicle driving controller reports the reaction to the echo to the test controller 620. At S624 the on-vehicle driving controller reports the reaction to the echo to the scenario simulator 630.

At S630A/S630B, a radar emission is received by each probe array 69x from the corresponding radar sensor RSx (S630A), and each probe array 69x individually notifies the radar target emulator 640 via the channel emulator 650 (S630B). At S631A, the radar target emulator 640 provisions each probe array 69x via the channel emulator 650, and at S631B each probe array 69x provides the echo signal to the corresponding radar sensor RSx. At S632A timing of the provisioning is reported by the channel emulator to the test controller 620, and at S632B each radar sensor RSx reports the received echo signal to the on-vehicle driving controller. At S633 the on-vehicle driving controller reports the reaction to the echo to the test controller 620. At S634 the on-vehicle driving controller reports the reaction to the echo to the scenario simulator 630.

At S640A/S640B, a radar emission is received by each probe array 69x from the corresponding radar sensor RSx (S640A), and each probe array 69x individually notifies the radar target emulator 640 via the channel emulator 650 (S640B). At S641A, the radar target emulator 640 provisions each probe array 69x via the channel emulator 650, and at S641B each probe array 69x provides the echo signal to the corresponding radar sensor RSx. At S642A timing of the provisioning is reported by the channel emulator to the test controller 620, and at S642B each radar sensor RSx reports the received echo signal to the on-vehicle driving controller. At S643 the on-vehicle driving controller reports the reaction to the echo to the test controller 620. At S644 the on-vehicle driving controller reports the reaction to the echo to the scenario simulator 630.

At S650A/S650B, a radar emission is received by each probe array 69x from the corresponding radar sensor RSx (S650A), and each probe array 69x individually notifies the radar target emulator 640 via the channel emulator 650 (S650B). At S651A, the radar target emulator 640 provisions each probe array 69x via the channel emulator 650, and at S651B each probe array 69x provides the echo signal to the corresponding radar sensor RSx. At S652A timing of the provisioning is reported by the channel emulator to the test controller 620, and at S652B each radar sensor RSx reports the received echo signal to the on-vehicle driving controller. At S653 the on-vehicle driving controller reports the reaction to the echo to the test controller 620. At S654 the on-vehicle driving controller reports the reaction to the echo to the scenario simulator 630.

As described above, the test controller 620 receives notification of reactions from the on-vehicle driving controller responsive to each of the echo signals received by the radar sensors. The reactions may be a primary subject of the testing described herein, as whether and how an on-vehicle driving controller reacts may be a primary mechanism for avoiding accidents.

The radar emissions received at S610A, S620A, S630A, S640A and S650A may be the same signal received repeatedly. Accordingly, an important aspect of the notifications at S610B, S620B, S630B, S640B and S650B is the timing of the notifications insofar as each notification results in the next echo in the sequence of echoes.

Figure 7:
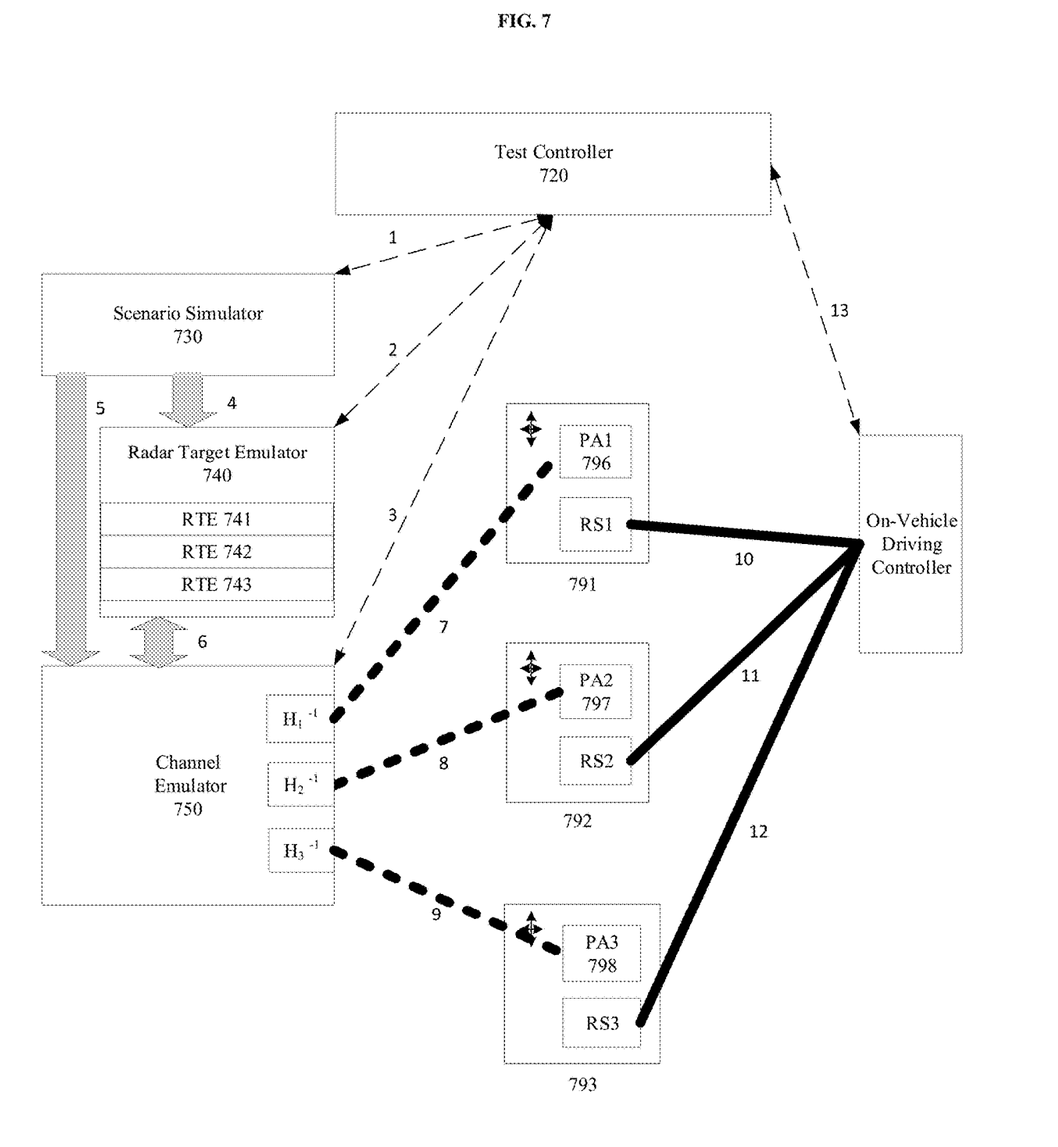
FIG. 7 illustrates a hybrid signal flow diagram for a simplified block diagram showing a logical arrangement of a test system for dynamic echo signal emulation for automobile radar sensor configurations, according to a representative embodiment.

FIG. 7 illustrates a hybrid signal flow diagram for a simplified block diagram showing a logical arrangement of a test system for dynamic echo signal emulation for automobile radar sensor configurations, according to a representative embodiment.

The test system 700 in FIG. 7 includes a test controller 720, a scenario simulator 730, a radar target emulator 740, a channel emulator 750, a first enclosure 791, a second enclosure 792, a third enclosure 793, a first probe array 796 in the first enclosure 791, a second probe array 797 in the second enclosure 792, and a third probe array 799 in the third enclosure 793.

The radar target emulator 740 includes and provides radar target emulations RTE 741, RTE 742 and RTE 743 which are representative of multiple radar target emulations for different scenarios provided by the scenario simulator 730. The number of radar target emulations included in and provided by the radar target emulator 740 is not limited to three, and a radar target emulator may provide dozens, hundreds or even thousands of different radar targets for any scenario provided by the scenario simulator 730. Each of the radar target emulations RTE 741, RTE 742 and RTE 743 is representative of objects encountered in simulated driving scenarios. The radar target emulations RTE 741, RTE 742 and RTE 743 may be based on actual test drives performed by a test vehicle, so that simulated drive test scenarios reflect echoes captured in actual test drives.

In FIG. 7, a radar sensor RS1 is provided in the first enclosure 791 with the first probe array 796, a radar sensor RS2 is provided in the second enclosure 792 with the second probe array 797, and a radar sensor RS3 is provided in the third enclosure 793 with the third probe array 798. An on-vehicle driving controller receives the echoes from the radar sensor RS1, the radar sensor RS2 and the radar sensor RS3, and reacts to the received echoes so as to control a vehicle by braking, accelerating, moving, or limiting movement. The radar sensors RS1, RS2, RS3 and the on-vehicle driving controller are representative elements of a vehicle subject to testing by the test system 700 in FIG. 7. Rather, than requiring the entire vehicle, only the radar sensors RS1, RS2, RS3 and the on-vehicle driving controller may be subjected to the testing, which may result in a comparatively smaller test space. Using a test system 700 as in FIG. 7, an automobile radar sensor configuration that includes radar sensors in each of the enclosures and the on-vehicle driving controller can be subjected rapidly to testing under numerous simulated driving scenarios that are, in turn, based on actual test drives performed by test vehicles.

In FIG. 7, the testing by the test system 700 starts by initiating the scenario simulator 730 at step 1, initiating the radar target emulator 740 at step 2, and initiating the channel emulator 750 at step 3. The scenario simulator 730 provisions the radar target emulator 740 at step 4, and the channel emulator 750 at step 5. The radar target emulator provides the radar target emulations RTE 741, RTE 742, RTE 743 to the channel emulator at step 6. The channel emulator provides the radar target emulations RTE 741, RTE 742, RTE 743 as echoes to the first probe array 796 at step 7, to the second probe array 797 at step 8, and to the third probe array 798 at step 9. The radar sensor RS1 in the first enclosure 791 provides the echoes to the on-vehicle driving controller at step 10. The radar sensor RS2 in the second enclosure 792 provides the echoes to the on-vehicle driving controller at step 11. The radar sensor RS3 in the third enclosure 793 provides the echoes to the on-vehicle driving controller at step 12. The on-vehicle driving controller executes routines and, in response to the echoes received at step 10, step 11 and step 12, determines whether and how to control the vehicle responsive to the received echoes. The on-vehicle driving controller provides control instructions to the test controller 720.

To be clear, one of the immediate benefits of dynamic echo signal emulation for automobile radar sensor configurations is the ability to analyze whether the on-vehicle driving controller is responding in a way that minimizes accidents and harm. Errors detected in the testing may reflect failure on the part of the on-vehicle driving controller, or an unsatisfactory configuration for the vehicle system that includes the radar sensors RS1, RS2 and the on-vehicle driving controller. An unsatisfactory configuration may be due, for example, to too few radar sensors, poor placement of the radar sensors RS1, RS2, RSE relative to one another in the vehicle, poor coverage by the radar sensors RS1, RS2, RS3, or other concerns that may be addressed to reduce the possibility of accidents.

Within each of the first enclosure 791, the second enclosure 792 and the third enclosure 793, the probe arrays and the radar sensors emit the radar signals and echoes sensed by one another. The probe arrays and the radar sensors are placed close to one another within each enclosure, and relative position of the probe arrays and the radar sensors is adjusted to form a stable and well-conditioned coupling radiation matrix $H_n$. One aspect of the testing is that the channel emulator 750 measures a transmit coupling matrix for each of the radar sensors RS1, RS2, RS3 by capturing radar signals emitted by each of the radar sensors RS1, RS2, RS3. The channel emulator 750 stores and applies an inversion matrix for each of the measured transmit coupling matrix for each of the radar sensors RS1, RS2, RSE as one function, so that each probe array optimally emits echoes to the radar sensors RS1, RS2, RS3 based on the measured transmit coupling matrix measured by the channel emulator 750. Additionally, analog signals of a receive coupling matrix for each of the radar sensors RS1, RS2 and RS3 are captured directly from the radar sensors RS1, RS2 and RS3, converted to digital by analog-to-digital conversion, and the digital representations of the signals of the receive coupling matrix are measured for each of the radar sensors RS1, RS2 and RS3. The channel emulator 750 stores and applies an inversion matrix for each of the measured receive coupling matrixes for each of the radar sensors RS1, RS2, RS3.

As should be clear from the above, the inversion matrix is only one function inside the channel emulator 750. Additionally, while three radar sensors RS1, RS2, RS3 are shown in FIG. 7, a vehicle configuration that is subjected to the testing described herein may include four or more radar sensors that are all tested together in the testing described herein. Similarly, while three radar target emulations RTE 741, RTE742, RTE743 are shown in FIG. 7, the radar target emulator 740 may provide a different radar target emulation for each of four or more radar sensors. The radar target emulations RTE741, RTE742, RTE743 are signal sets representative of a driving scenario in which numerous different echoes may be received from different objects at any one time by the radar sensors RS1, RS2, RS3.

Accordingly, dynamic echo signal emulation for automobile radar sensor configurations enables dynamic testing of an automobile radar sensor configuration without requiring the automobile or a chamber with enough space to enclose the vehicle. The dynamic echo signal emulation for automobile radar sensor configurations described herein also enables dynamic testing of driving scenarios without changing locations, times, weather conditions or other environmental characteristics of the test environment that includes the test system. The dynamic echo signal emulation for automobile radar sensor configurations described herein also enables testing with multiple driving scenarios without having to necessarily physically move any probe array during a driving scenario or between two driving scenarios.

A variety of problematic aspects of the background are addressed by the dynamic echo signal emulation for automobile radar sensor configurations described herein. For example, the test systems described herein can support simultaneous multi-target dynamic echo signal emulation for multiple radar sensors and is scalable for additional radar sensors beyond those described in example embodiments herein. Moreover, the test systems described herein may include probes on a one-to-one basis with the radar sensors to emulate the echoes as described herein. Additionally, different kinds of channel scenarios can be supported using channel emulators as described herein since the target echo emulation is performed in the radar target emulator and channel emulator and is independent of spatial emulation inside chamber or another test environment for the test system.

Although dynamic echo signal emulation for automobile radar sensor configurations has been described with reference to several exemplary embodiments, it is understood that the words that have been used are words of description and illustration, rather than words of limitation. Changes may be made within the purview of the appended claims, as presently stated and as amended, without departing from the scope and spirit of dynamic echo signal emulation for automobile radar sensor configurations in its aspects. Although dynamic echo signal emulation for automobile radar sensor configurations has been described with reference to particular means, materials and embodiments, dynamic echo signal emulation for automobile radar sensor configurations is not intended to be limited to the particulars disclosed; rather dynamic echo signal emulation for automobile radar sensor configurations extends to all functionally equivalent structures, methods, and uses such as are within the scope of the appended claims.

For example, several of the FIGs. herein show echoes being provided one at a time based on confirmation of a received radar signal. However, as described herein echoes may also be prearranged as a set that is spaced apart at timings based on identifying the periodicity of the received radar signals, so that confirmation of a receipt of each individual radar signal is not necessarily required before providing the echoes that are expected to response to each individual radar signal. Additionally, several of the FIGS. herein show three separate devices or systems for the scenario simulator, the radar target emulator and the channel emulator. However, two or even all three of these three separate devices or systems may be combined in a single device or system that simultaneously runs multiple different software programs to implement the functionality that is otherwise provided by the three separate devices or systems.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. A system for testing automobile radar sensor configurations, comprising:
   a plurality of probe arrays;
   a plurality of enclosures that each enclose a different one of the plurality of probe arrays together with a corresponding different automobile radar sensor of a plurality of automobile radar sensors, wherein each probe array is configured to receive radar signals from the corresponding automobile radar sensor and emulate echo signals back to the corresponding automobile radar sensor;
   a channel emulator configured to supply the echo signals to each of the plurality of probe arrays;
   a test controller comprising a memory that stores instructions and a processor that executes the instructions, wherein the test controller controls the channel emulator and is configured to perform performance testing on an automobile radar sensor configuration that includes the plurality of automobile radar sensors and an automobile driving controller that reacts to the echo signals received by each of the automobile radar sensors;
   a radar target emulator that provides, to the channel emulator, radar target signals emulating targets of the radar signals from the plurality of automobile radar sensors as inputs used by the channel emulator to generate the echo signals emulated by the plurality of probe arrays; and,
   a scenario simulator that provides radar target parameters to the radar target emulator and channel emulator parameters to the channel emulator for each of a plurality of different driving scenarios, wherein the radar target emulator varies the radar target signals for the different driving scenarios and the channel emulator varies the echo signals for the different driving scenarios, wherein: a subset of probe antenna elements is selected for each of the plurality of probe arrays based on measurements of a transmit coupling matrix and a receive coupling matrix for a corresponding automobile radar sensor; the channel emulator applies channel effects to the radar target signals and provides, to the plurality of probe arrays, the radar target signals with channel effects applied as the echo signals emulated by the plurality of probe arrays; the radar target emulator or the channel emulator notifies the test controller of timing of each of the echo signals provided to the corresponding automobile radar sensor; the test controller receives notification of reactions from the automobile driving controller responsive to each of the echo signals received by the plurality of automobile radar sensors; and each of the plurality of probe arrays couples with the corresponding automobile radar sensor within a reactive field of the corresponding automobile radar sensor.

2. A method for testing automobile radar sensor configurations, the method comprising:
   enclosing within each of a plurality of enclosures a different one of a plurality of probe arrays together with a corresponding different automobile radar sensor of a plurality of automobile radar sensors, wherein each probe array is configured to receive radar signals from the corresponding automobile radar sensor and emulate echo signals back to the corresponding automobile radar sensor;
   receiving, by a channel emulator, channel emulator parameters;
   receiving, by the channel emulator, radar target signals;
   applying, by the channel emulator, channel effects to the radar target signals;
   providing, by the channel emulator, radar target signals with the channel effects applied to the plurality of probe arrays as echo signals that emulate echoes to the radar signals;
   performing, by a test controller, performance testing on an automobile radar sensor configuration that includes the plurality of automobile radar sensors and an automobile driving controller that reacts to the echo signals received by each of the automobile radar sensors;
   measuring, by the channel emulator, a transmit coupling matrix for each of the automobile radar sensors by capturing radar signals emitted by each of the automobile radar sensors; and
   capturing signals of a receive coupling matrix for each of the automobile radar sensors and measuring digital representations of the signals of the receive coupling matrix for each of the automobile radar sensors.

3. The method of claim 2, further comprising:
   notifying, by the channel emulator or by a radar target emulator that provides the radar target signals to the channel emulator, the test controller each time an echo signal is emitted; and
   receiving, by the test controller, notification of emission of each echo signal from the radar target emulator or the channel emulator and a reaction to each echo signal from the automobile driving controller, wherein the performance testing is performed based on the reaction to each echo signal.

4. The method of claim 2, further comprising:
   receiving by a radar target emulator, radar target parameters, wherein the radar target emulator provides the radar target signals to the channel emulator, and providing, by a scenario simulator, radar target parameters to the radar target emulator and channel emulator parameters to the channel emulator for each of a plurality of different driving scenarios, wherein the radar target emulator varies the radar target signals for the different driving scenarios and the channel emulator varies the echo signals for the different driving scenarios.

5. The method of claim 2, further comprising:
loading the channel emulator with radar sensor transmit antenna complex patterns and radar sensor receive antenna complex patterns for each of the plurality of automobile radar sensors, and
applying, by the channel emulator, an inversion of a radiation channel matrix for each of the plurality of automobile radar sensors based on the radar sensor transmit antenna complex patterns and radar sensor receive antenna complex patterns for each of the plurality of automobile radar sensors.

6. A system for testing automobile radar sensor configurations, comprising:
a plurality of probe arrays;
a plurality of enclosures that each enclose a different one of the plurality of probe arrays together with a corresponding different automobile radar sensor of a plurality of automobile radar sensors, wherein each probe array is configured to receive radar signals from the corresponding automobile radar sensor and emulate echo signals back to the corresponding automobile radar sensor;
a channel emulator configured to supply the echo signals to each of the plurality of probe arrays, the channel emulator being loaded with radar sensor transmit antenna complex patterns and radar sensor receive antenna complex patterns for each of the plurality of automobile radar sensors, wherein the channel emulator applies an inversion of a radiation channel matrix for each of the plurality of automobile radar sensors based on measurements of a coupling matrix for each of a transmit antenna array and a receive antenna array of a corresponding automobile radar sensor; and
a test controller comprising a memory that stores instructions and a processor that executes the instructions, wherein the test controller controls the channel emulator and is configured to perform performance testing on an automobile radar sensor configuration that includes the plurality of automobile radar sensors and an automobile driving controller that reacts to the echo signals received by each of the automobile radar sensors.

7. The system of claim 6, further comprising:
a radar target emulator that provides, to the channel emulator, radar target signals emulating targets of the radar signals from the plurality of automobile radar sensors as inputs used by the channel emulator to generate the echo signals emulated by the plurality of probe arrays.

8. The system of claim 7, further comprising:
a scenario simulator that provides radar target parameters to the radar target emulator and channel emulator parameters to the channel emulator for each of a plurality of different driving scenarios, wherein the radar target emulator varies the radar target signals for the different driving scenarios and the channel emulator varies the echo signals for the different driving scenarios.

9. The system of claim 8, wherein: a subset of probe antenna elements is selected for each of the plurality of probe arrays based on measurements of a transmit coupling matrix and a receive coupling matrix for a corresponding automobile radar sensor;
the channel emulator applies channel effects to the radar target signals and provides, to the plurality of probe arrays, the radar target signals with channel effects applied as the echo signals emulated by the plurality of probe arrays;
the radar target emulator or the channel emulator notifies the test controller of timing of each of the echo signals provided to the corresponding automobile radar sensor,
the test controller receives notification of reactions from the automobile driving controller responsive to each of the echo signals received by the plurality of automobile radar sensors; and
each of the plurality of probe arrays couples with the corresponding automobile radar sensor within a reactive field of the corresponding automobile radar sensor.

* * * * *